June 21, 1932.  W. F. HENDERSON  1,864,244
DEHYDRATED CELLULOSE BUNG, TUBE, ETC
Filed July 3, 1929
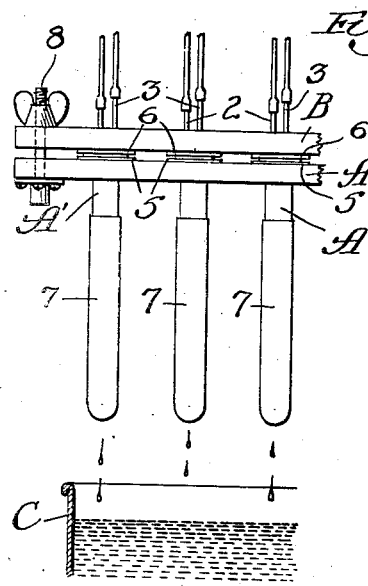
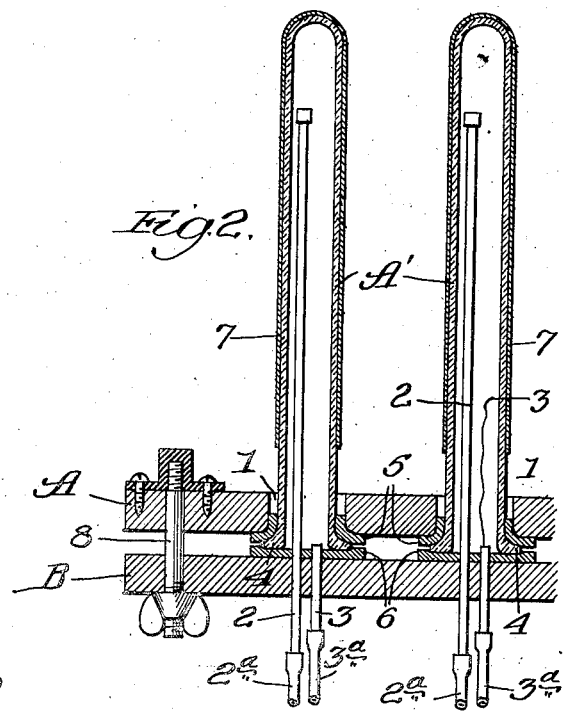
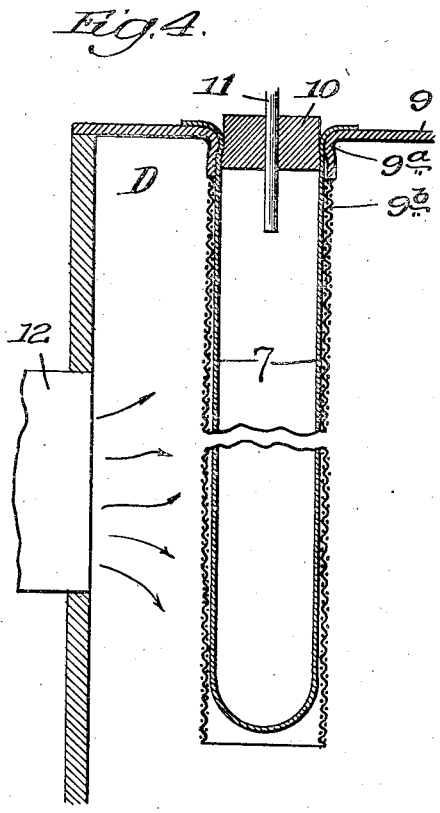
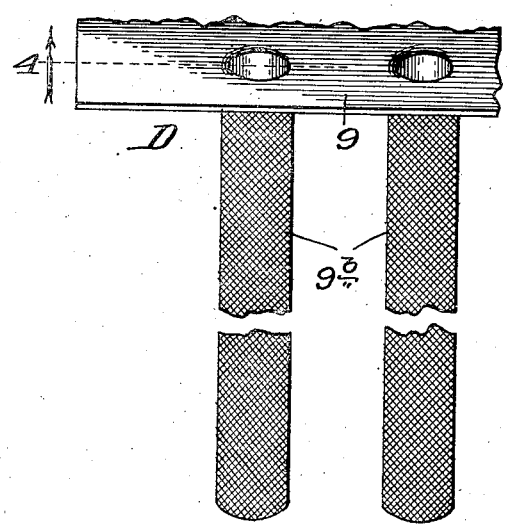
Inventor:
William F. Henderson Patented June 21, 1932

1,864,244

UNITED STATES PATENT OFFICE

WILLIAM F. HENDERSON, OF CHICAGO, ILLINOIS, ASSIGNOR TO THE VISKING CORPORATION, OF CHICAGO, ILLINOIS, A CORPORATION OF VIRGINIA

DEHYDRATED CELLULOSE BUNG, TUBE, ETC.

Application filed July 3, 1929. Serial No. 375,859.

This invention relates particularly to the production of improved cellulose films, such as are used for artificial sausage casings and various other purposes.

An important application of the invention is in the field of artificial bungs to serve as a substitute for natural bungs or caps for use in encasing certain types of smoked meats. So-called "bungs" or "caps" are of tubular form but closed at one end. The natural casing of this type is derived from the coecum of sheep, cattle, or swine.

The primary object of the present invention is the production of a strong synthetic cellulose film; and one useful application of such a film is in the production of artificial bungs.

The artificial bung may be produced by coating a suitable form or mandrel with viscose, causing the viscose to dry, and subsequently regenerating the cellulose from the viscose. The regeneration is ordinarily effected by means of a suitable acid solution. By employing suitable precautions, a bung produced upon a mandrel in this manner may be readily stripped from or slipped off the mandrel.

In carrying out the present invention, viscose may be first produced by means of a well-known viscose reaction, and a solution may thus be obtained which is suitable for the purpose of the invention. Viscosity, concentration of cellulose and caustic soda, and operating conditions have a bearing on the nature of the product, and all these factors should be suitably controlled.

A viscose solution found to be very satisfactory for the manufacture of synthetic bungs corresponding with sheep bungs may be given as a typical example as follows:

| | Per cent |
|---|---|
| Cellulose | 3.75 |
| Sodium hydroxide | 5.35 |
| Sugar syrup (glucose) | 0.25 |

The viscosity of the solution preferably is about the same as that of glycerine. The percentages given above are based upon a total of 100%, the remainder being water.

The percentages stated above differ from the percentages now used in producing artificial sausage casings. Also, the use of a soluble carbo-hydrate in the compound is novel and accomplishes a useful result in the new compound.

The process will be explained with reference to the accompanying drawing, which illustrates apparatus suitable for use in the practice of the process. In the drawing—

Fig. 1 is a broken elevational view of apparatus suitable for forming bungs; Fig. 2, a broken sectional view on an enlarged scale of a portion of the apparatus shown in Fig. 1, showing the viscose films undergoing a drying operation; Fig. 3, a broken perspective view showing a device for use in connection with the inflation and drying of the bungs after they have been produced by regenerating the cellulose from the viscose films; and Fig. 4, a broken sectional view illustrating the manner of inflating and drying the bungs.

In the illustration given, A designates a supporting plate provided with perforations 1 through which extend glass mandrels A'; B, a companion plate through which extend steam pipes 2 and drain pipes 3; C, a vessel containing a solution of viscose; and D, apparatus for drying the cellulose tubes or sacks after they have been stripped from the mandrels following the regenerating operation.

Processes of preparing viscose suitable for use in providing a solution of the character described for the practice of the present invention are described in Henderson Patent, No. 1,601,686 granted September 28, 1926; Henderson, No. 1,645,050 granted October 11, 1927; and Henderson and Dietrich, No. 1,612,508 granted December 28, 1926. The last-mentioned patent describes, also, a process of inflating and drying a cellulose tube, suitable for use as an artificial sausage casing.

In accordance with the present invention, the viscose film is subjected to a drying operation before the regenerating operation which converts the film again into cellulose. This interposed step of drying the viscose film before the operation of regeneration has the effect of producing a cellulose film of much greater strength than has been possible by known methods.

In carrying out the present process as applied to the production of cellulose bungs adapted to serve as a substitute for sheep bungs, mandrels about 16 inches long and 2 inches in diameter preferably are employed. These mandrels, designated A', are closed at one end and are provided at the other end with a lip or flange 4 which is confined between gaskets 5 and 6 with which the plates or boards A and B are equipped. The gasket 5 is in the form of a ring in which the base-portion of the mandrel is supported. Any desired number of mandrels may be supported on plate A in the manner illustrated. The mandrels are coated with a viscose solution, either by a dipping operation, or by a spraying operation. The bungs thus produced are designated 7. The viscose adheres to the glass mandrel to form a suitable film. The excess may be permitted to drain from the mandrel in the manner illustrated in Fig. 1.

The boards A and B are shown secured together at their marginal portions by means of clamping devices 8. After the coating operation, the structure supporting the mandrels may be turned over, the steam may be admitted to the interior of the mandrels through hose connections $2^a$, and drainage may occur through hose connections $3^a$. While in the inverted position, the films are completely dried and thus dehydrated. After the drying operation, a second coating of viscose may be applied, and a second drying operation may be performed. This may be repeated as often as desired.

The mandrels may then be dipped into an acidified salt bath suitable for regenerating the cellulose from the viscose. A suitable bath has the following composition:

Sodium sulphate _____ 10%   ±2%
Sulfuric acid _____ 2.25% ± .25%

These chemicals are in solution in water, and percentages of chemicals are stated with relation to the total mixture.

The temperature of the bath preferably is 20°–22° C. Following the regeneration, the product is washed or rinsed and the cellulose sack or bung can be readily slipped off from the mandrel while wet. The sacks or tubes are then washed in running water until free from acid. They are then treated with dilute glycerine in order to prevent cracking when dry. A conveyor belt (not shown) may serve to carry the wet bungs under a squeeze roll which eliminates the excess of water. The pressed sacks adhere to the belt or to the squeeze roll from which they can be easily detached by properly directed jets of compressed air which may serve also to carry the sacks into a receiver which contains glycerine. After being immersed in the glycerine solution, the bungs are again pressed to eliminate the excess of glycerine, and air jets serve to deposit the bungs in a suitable receiver where they may be kept enclosed until they can be put through the drier.

The glycerine solution preferably consists of 30%–40% glycerine in water. A good percentage is 35%. Following the subsequent drying operation, the bungs still retain a considerable percentage of thoroughly dispersed glycerine. The glycerine is of a hygroscopic character and retains enough moisture to keep the bungs in a softened, pliable condition.

It may be added that the sugar content in the viscose, owing to its soluble character, tends to loosen the film on the mandrel and create a thin liquid film between the cellulose film and the mandrel, thus facilitating removal from the mandrel.

The apparatus D for drying the cellulose films after their removal from the mandrels is shown as comprising a plate 9 which is provided with perforate bosses $9^a$; and fine gauze tubes $9^b$ depending from the bosses $9^a$. The hollow bosses $9^a$ are suitably rounded at their inner surfaces so as to avoid injury to the bung. The open end of the bung is supported in the throat afforded by the tubular member $9^a$; and a cork 10 serves to clamp the bung in the throat. Through the cork 10 extends a tube 11; and very light air pressure may be introduced through this tube to inflate the bung. The gauze tube $9^b$ serves as a confining tube and insures uniform diameter of the bung. Hot air may be blown between and through the gauze tubes to effect the drying of the bungs. In the illustration given, 12 designates a conduit through which air is delivered. This air preferably is heated to 40°–50° C.

It may be stated that it is desirable to vary the viscose, depending upon the kind of sack or bung desired. For example, higher cellulose content, or higher viscosity, or both, yield correspondingly heavier walled products.

The amount of sodium hydroxide in the viscose has a pronounced effect on the character of the film. In the solution given above, the crystallization of the sodium hydroxide, sodium carbonate, and related compounds, as the viscose film is dried, gives the final cellulose film an opalescent quality. If gradual drying is used, extending over a period of hours, the crystals grow to considerable size and leave the imprint of their pattern permanently in the film. In this manner, films with singularly beautiful patterns may be produced. Ordinarily, however, the drying preferably is effected in a short time in the production of artificial bungs.

If the amount of sodium hydroxide in the viscose is taken in quite low percentages, say, less than 2.5%, a transparent, glassy film results.

The age of the viscose has an effect on the type of film produced. Viscose of the kind described above, aged for five days at 18° C., yields an opalescent film. As the viscose grows older, the opalescence diminishes until at eight days, the films are almost clear.

As indicated above, the presence of a very soluble substance in the viscose, such as sugar, dextrine, and so forth, causes a diffusion of water inward towards the mandrel so that a film of water forms between the cellulose and the mandrel and greatly facilitates the removal of the product.

As indicated, the drying and dehydrating treatment to which the viscose film is subjected before regeneration of the film results in the ultimate production of a denser and tougher film than can be produced if the viscose film is regenerated without first being dried. Even when soaked in water, a film produced in this way absorbs less water than do those produced by the customary wet precipitation; hence the dehydrated films remain stronger, and when they are dried they undergo less shrinkage.

The foregoing detailed description has been given for clearness of understanding only, and no unnecessary limitations should be understood therefrom, but the appended claims should be construed as broadly as permissible, in view of the prior art.

What I regard as new, and desire to secure by Letters Patent, is:

1. A process of the character set forth comprising: producing a viscose film; drying the film; and then regenerating the film.

2. A process as stated in claim 1, followed by the step of incorporating a hygroscopic agent in the film after the regenerating step.

3. A process of the character set forth comprising: producing upon a mandrel a viscose film containing a small amount of a soluble compound; drying the film; regenerating the film; and stripping the film from the mandrel.

4. A process of the character set forth comprising: producing upon a mandrel a viscose film; drying the film in a regenerating bath; regenerating the dried film; removing the film from the mandrel; introducing the film within a confining foraminous wall; and inflating and drying the film.

5. In the production of a cellulose bung, the steps which comprise: coating a mandrel with a viscose solution; subjecting the viscose film to a drying action; regenerating the dried film in a regenerating bath and removing the film from the mandrel; and drying the regenerated film.

6. As a new article of manufacture, a strong, dense, cellulose film regenerated from a dried viscose film.

7. As a new article of manufacture, a strong tubular cellulose bung having a closed end, said bung regenerated from a dried viscose bung.

8. A method of forming a cellulose article, which method comprises imparting a desired shape to a quantity of viscose, drying the viscose, and then regenerating the viscose.

9. A method of forming cellulose articles, which method comprises imparting a desired shape to a quantity of viscose, heating the viscose to dry it, and then regenerating the viscose.

10. A method of forming cellulose articles, which method comprises imparting a desired shape to a quantity of viscose, heating the viscose to dry it, then regenerating the viscose, and subsequently treating the regenerated viscose with a hygroscopic agent.

11. A method of producing a cellulose article, which method comprises introducing a small amount of a soluble compound in the viscose, imparting the desired shape to the viscose, drying the viscose, and then regenerating the viscose.

12. A method of producing a cellulose article, which method comprises introducing a small amount of soluble compound in the viscose, imparting the desired shape to the viscose, drying the viscose, then regenerating the viscose, and treating the regenerated viscose with a hygroscopic agent.

13. As a new article of manufacture, an article formed from cellulose which has been regenerated from dry viscose.

14. A method of preparing regenerated cellulose, which method comprises drying a quantity of viscose, and then regenerating the viscose.

WILLIAM F. HENDERSON.